(12) United States Patent
Chan

(10) Patent No.: US 9,335,488 B2
(45) Date of Patent: May 10, 2016

(54) ADAPTER FOR INTERFACING OPTICAL FIBER CONNECTORS WITH ONE ANOTHER, AND A METHOD

(71) Applicant: Avago Technologies General IP (Singapore) Pte. Ltd., Singapore (SG)

(72) Inventor: Seng-Kum Chan, Santa Clara, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 123 days.

(21) Appl. No.: 14/258,111

(22) Filed: Apr. 22, 2014

(65) Prior Publication Data
US 2015/0301286 A1    Oct. 22, 2015

(51) Int. Cl.
*G02B 6/38* (2006.01)

(52) U.S. Cl.
CPC ............ *G02B 6/3825* (2013.01); *G02B 6/3879* (2013.01); *G02B 6/3885* (2013.01)

(58) Field of Classification Search
None
See application file for complete search history.

(56) References Cited

U.S. PATENT DOCUMENTS

| | | | | |
|---|---|---|---|---|
| 5,600,747 A * | 2/1997 | Yamakawa | ........... | G02B 6/3879 385/59 |
| 5,838,856 A * | 11/1998 | Lee | ........... | G02B 6/3821 385/136 |
| 6,520,686 B1 * | 2/2003 | Kiani | ........... | G02B 6/3882 385/54 |
| 7,534,052 B2 * | 5/2009 | Fujiwara | ........... | G02B 6/4214 385/49 |
| 7,559,702 B2 * | 7/2009 | Fujiwara | ........... | G02B 6/4292 385/88 |
| 7,841,777 B2 | 11/2010 | Howard et al. | | |
| 8,475,054 B2 * | 7/2013 | Shimotsu | ........... | G02B 6/3817 385/75 |
| 8,936,403 B2 * | 1/2015 | Howard | ........... | G02B 6/3829 385/89 |
| 9,097,859 B2 * | 8/2015 | Wu | ........... | G02B 6/32 |
| 2003/0031421 A1 * | 2/2003 | Kiani | ........... | G02B 6/3882 385/59 |
| 2006/0051028 A1 * | 3/2006 | Sasaki | ........... | G02B 6/3825 385/55 |
| 2010/0135618 A1 * | 6/2010 | Howard | ........... | G02B 6/3829 385/79 |
| 2014/0193116 A1 * | 7/2014 | Bylander | ........... | G02B 6/4249 385/33 |

OTHER PUBLICATIONS

Optical Connector Case for Indoor Installation, http://global-sei.com, 2014, Sumitomo Electric Industries, Ltd.
Sc/APC Adapter, Reduced Flange and Dust Shutter, http://zsdsales.en.made-in-china.com, 2014, Made in China.com.

* cited by examiner

*Primary Examiner* — Sung Pak

(57) ABSTRACT

An adapter is provided for interfacing MOF connectors with one another where the MOF connectors have optical pathways that bend by a non-zero-degree angle (e.g., 90°±15°) in between the ends of the optical fibers held in the connectors and the output facets of the connectors. The adapter is configured to mate with two such connectors and to bring their optical pathways into precise optical alignment with one another.

21 Claims, 15 Drawing Sheets

ADAPTER FOR INTERFACING OPTICAL FIBER CONNECTORS WITH ONE ANOTHER, AND A METHOD

TECHNICAL FIELD OF THE INVENTION

The invention relates to optical communications. More particularly, the invention relates to an adapter that interfaces optical fiber connectors with one another.

BACKGROUND OF THE INVENTION

In optical communications systems and networks, optical fiber cables are used to interconnect components and to carry optical signals between the components. The optical fiber cables have optical fiber connectors on each end that hold the ends of the optical fibers of the cable. Optical fiber cables may have a single optical fiber or multiple fibers. Optical fiber cables that have multiple optical fibers are terminated on their ends with multi-optical fiber (MOF) connectors. MOF connectors are adapted to mate with multi-channel optical communications modules, referred to herein as parallel optical communications modules. A parallel optical communications module is a device that includes multiple optoelectronic devices, such as, for example, laser diodes, light-emitting diodes (LEDs) and/or photodiodes, and various electrical components, such as, for example, laser diode driver integrated circuits (ICs), transimpedance amplifiers (TIAs) and/or receiver ICs.

Optical signals generated by the laser diodes or LEDs are optically coupled by an optics system of the module into the MOF connector connected thereto, which then couples the signals into respective ends of respective optical fibers held in the MOF connector. Optical signals passing out of ends of optical fibers held in the MOF connector are coupled by the optics system of the parallel optical communications module onto respective photodiodes of the module.

MOF connectors are available in a variety of types, styles and configurations, as are the parallel optical communications modules with which they are used. MOF connectors of all types, styles and configurations perform the same function, namely, the function of mechanically coupling the ends of the fibers held therein with the respective mated parallel optical communications modules. Mating features of the MOF connector engage mating features of the parallel optical communications module to mechanically couple the connector with the module in a way that optically aligns the optical pathways of the connector with the optical pathways of the module.

There are times when it is necessary or desirable to interface an MOF connector of one optical fiber cable with an MOF connector of another optical fiber cable. For example, it may be necessary or desirable to extend the length of an optical link by joining multiple optical fiber cables together end to end. For this reason, some MOF connectors are designed to be able to mate with one another in addition to being designed to mate with a parallel optical communications module. For example, female mating features (e.g., cylindrical holes) of one of the MOF connectors may be shaped, sized and positioned to receive male mating features (e.g., pins) of another MOF connector. In such cases, the mating of the MOF connectors brings the ends of the optical fibers held in one of the MOF connectors into proximity and alignment with the respective ends of the optical fibers held in the other MOF connector. In some cases, a receptacle or adapter is used to hold the MOF connectors and maintain them in the mated arrangement.

Some manufacturers of MOF connectors also manufacture adapters that are designed to interconnect the MOF connectors. For example, US Conec, a company headquartered in Hickory, North Carolina, manufactures an adapter for interconnecting two MOF connectors known in the industry as MTP® connectors, which are also manufactured by US Conec. MTP® connectors have multi-fiber ferrules that hold the ends of the fibers. The adapter has receptacles formed in opposite sides thereof into which respective MTP® connectors are inserted. When the connectors are inserted into the receptacles of the adapter, the end faces of the multi-fiber ferrules abut one another in an aligned configuration such that the respective fiber end faces held in the abutting ferrules are precisely aligned with one another. The precise alignment of the respective fiber end faces is important in preventing optical losses from occurring as optical signals are coupled from the fiber end faces held in one ferrule into the opposing fiber end faces held in the other ferrule.

Although such adapters work well for their intended purposes, they are not suitable for use with all types of MOF connectors. For example, such adapters are not suitable for use with MOF connectors in which the optical pathways turn, or bend, in between the end faces of the optical fibers held therein and the output facet of the connector. For example, MOF connectors exist that bend the optical pathways by a non-zero angle (e.g., 90°) in between the ends of the optical fibers and the output facet of the MOF connector. Currently, suitable adapters for easily, quickly and precisely interfacing such connectors do not exist. Accordingly, a need exists for such an adapter.

SUMMARY OF THE INVENTION

The invention is directed to an adapter for optically interfacing a first MOF connector with a second MOF connector. The first and second MOF connectors are identical in type and have first and second optics systems, respectively, that bend light at non-zero-degree angles. The adapter comprises first and second mounting surfaces disposed on first and second sides, respectively, of the adapter. The first side of the adapter has at least one mating feature thereon for mating with at least one mating feature of the first MOF connector. An optical window of the adapter passes through the first mounting surface. When the mating feature of the first mounting surface is mated with the mating feature of the first MOF connector, a first optical facet of the first MOF connector is adjacent to and aligned with the optical window. The second mounting surface is opposite the first mounting surface. The second side of the adapter has at least one mating feature thereon for mating with the mating feature of the second MOF connector. The optical window passes through the second mounting surface such that the first and second mounting surfaces are optically interconnected by the optical window. When the mating feature of the second side is mated with the mating feature of the second MOF connector, a second optical facet of the second MOF connector is adjacent to and aligned with the optical window and with the first optical facet of the first MOF connector to allow optical signals to be optically coupled between the facets of first and second MOF connectors via the optical window of the adapter.

The method comprises providing an adapter that is configured to optically interface the first and second MOF connectors with one another, mounting the first MOF connector on the first mounting surface such that at least one mating feature on the first side of the adapter is mated with at least one mating feature of the first MOF connector, mounting the second MOF connector on the second mounting surface such that at least one mating feature on the second side of the adapter is mated with at least one mating feature of the second MOF connector, and transferring optical signals between the first and second optical facets of first and second MOF connectors, respectively, via the optical window of the adapter.

These and other features and advantages of the invention will become apparent from the following description, drawings and claims.

DETAILED DESCRIPTION OF AN ILLUSTRATIVE EMBODIMENT

Figure 1A:
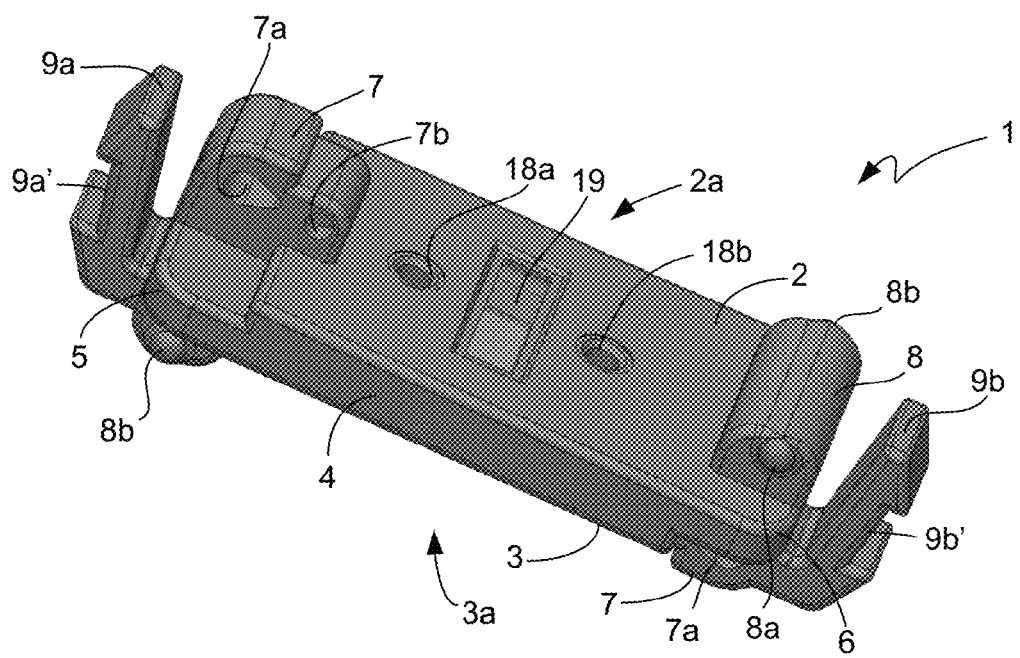
FIGS. 1A and 1B illustrate top and bottom perspective views of an adapter in accordance with an illustrative embodiment for interfacing two MOF connectors in a front-to-back arrangement of the connectors.

In accordance with the invention, an adapter is provided for interfacing MOF connectors with one another. The MOF connectors with which the adapter is used have optical pathways that bend by a non-zero-degree angle (e.g., 90°±15°) in between the ends of the optical fibers held in the connectors and the output facets of the connectors. In accordance with the illustrative embodiments, the adapter is configured to mate with two such connectors and to bring their optical pathways into precise optical alignment with one another.

MOF connectors having optical pathways that bend by a non-zero-degree angle in between the ends of the optical fibers and the output facets of the connectors are typically used with parallel optical communications modules that mount on a surface of a circuit board. Such modules are sometimes referred to as mid-plane-mounted modules due to the fact that they mount in a plane that is defined by the mounting surface of the circuit board. With a mid-plane-mounted module, the mated MOF connector is typically mounted on a top side of the module with the output facet of the module facing down toward the module. Such MOF connectors typically include an optics system that bends the optical pathways in between the ends of the fibers held in the connector and the output facet of the connector by an angle of 90°±15°. Because the adapter described herein is configured to mate with these types of MOF connectors, the term "MOF connector," as that term is used hereinafter, will be used to denote an MOF connector having an optics system that bends the optical pathways of the connector in between the ends of the fibers held in the connector and the output facet of the connector by a non-zero-degree angle that is in the range of 90°±25°), and is typically is in the range of 90°±15°.

An example of such an MOF connector known in the industry as a Prizm® connector is described herein. The Prizm® connector is offered by US Conec. In the illustrative embodiments of the adapter described herein, the adapter is specifically designed to mate with two of the Prizm® connectors and to optically align their respective optical pathways with one another. It should be noted, however, that the principles and concepts of the invention can be applied to provide an adapter that is suited for use with other MOF connectors. Therefore, the adapter is not limited to being used with Prizm® connectors, but may be used with all types of MOF connectors that meet the foregoing definition, as will be understood by those of skill in the art in view of the description being provided herein. A few illustrative embodiments of the adapter and of a Prizm® connector that works with the adapter will now be described with reference to FIGS. 1A-15, in which like reference numerals represent like features, elements or components. It should be noted that features, elements or components shown in the figures are not necessarily drawn to scale.

Figure 1B:
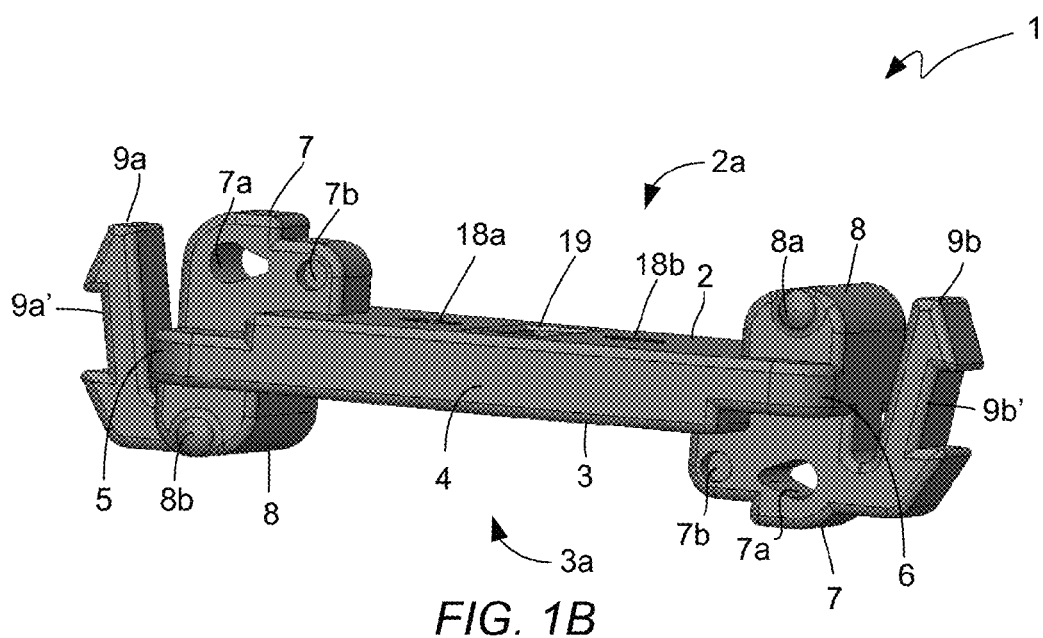
Figure 2A:
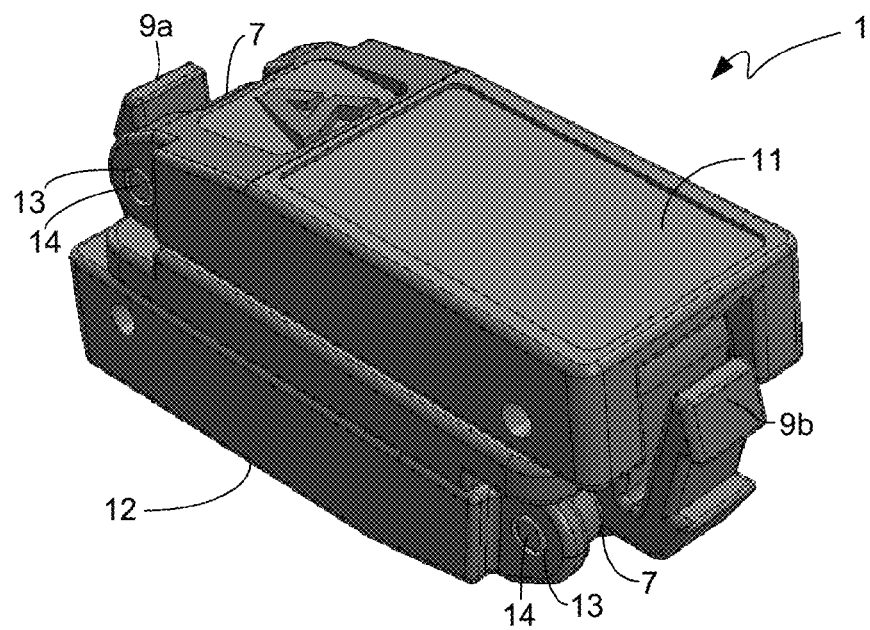
FIGS. 2A and 2B illustrate top perspective views of the adapter shown in FIGS. 1A and 1B having top and bottom covers pivotally secured thereto in accordance with an illustrative embodiment.
Figure 2B:
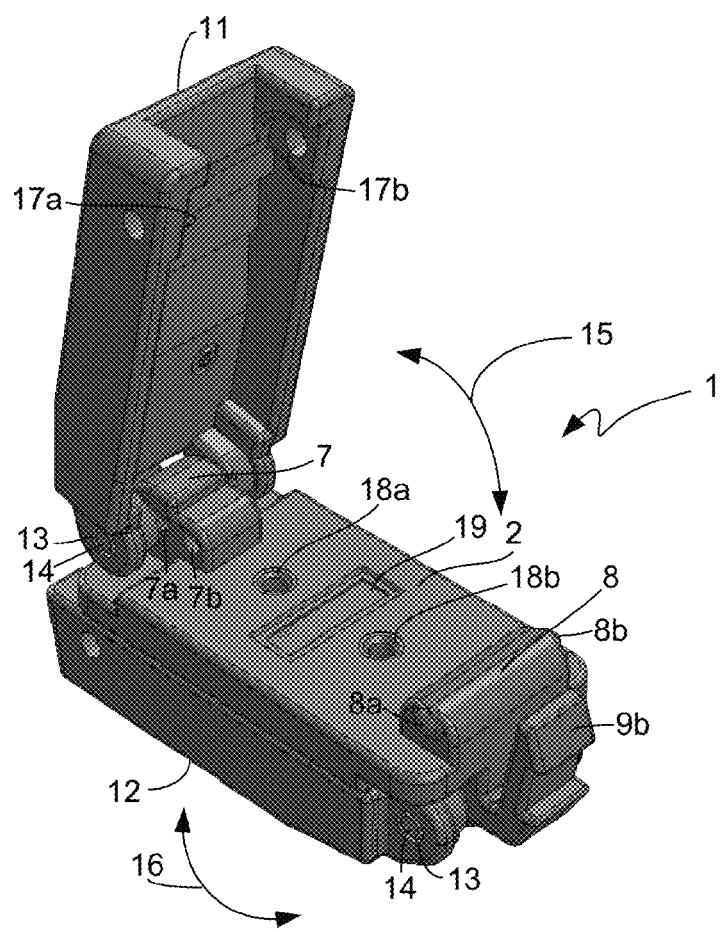
Figure 3A:
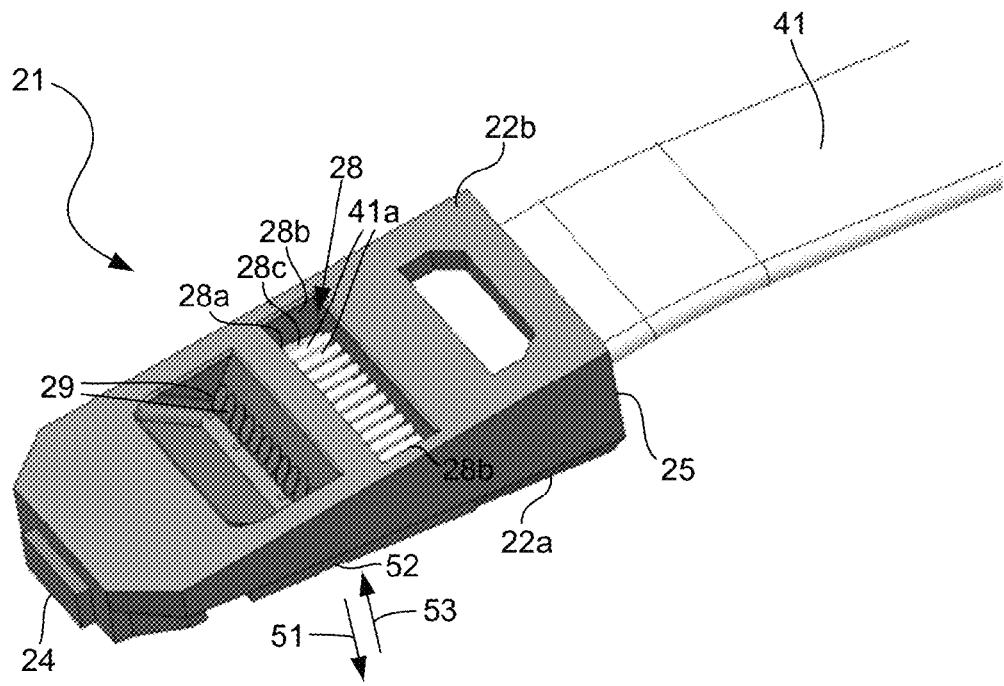
FIGS. 3A and 3B illustrate top and bottom perspective views of a MOF connector in accordance with an illustrative embodiment with which the adapter shown in FIGS. 1A and 1B is configured to mate.
Figure 3B:
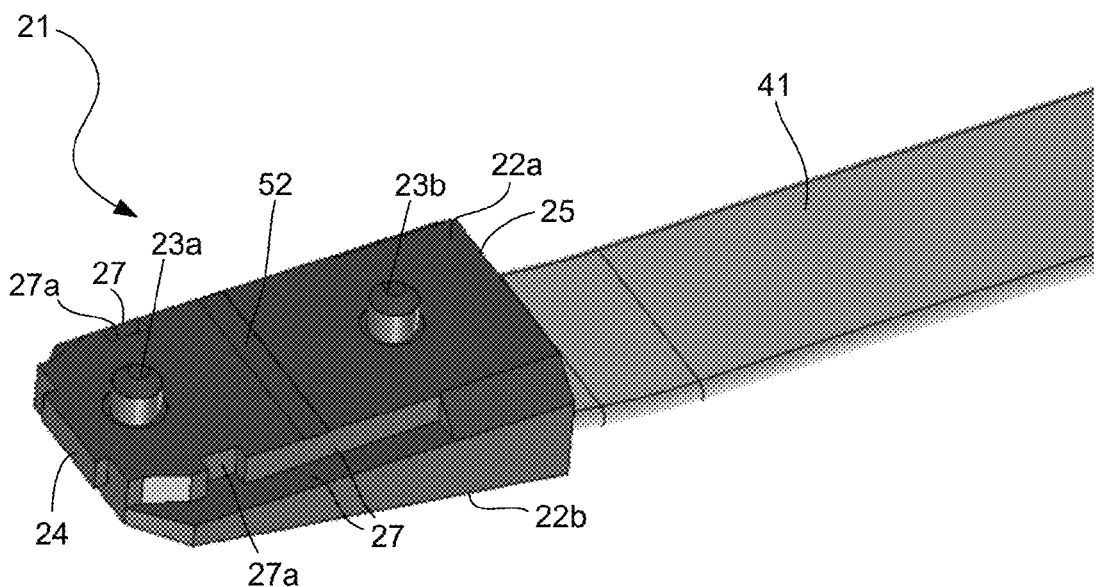
Figure 4:
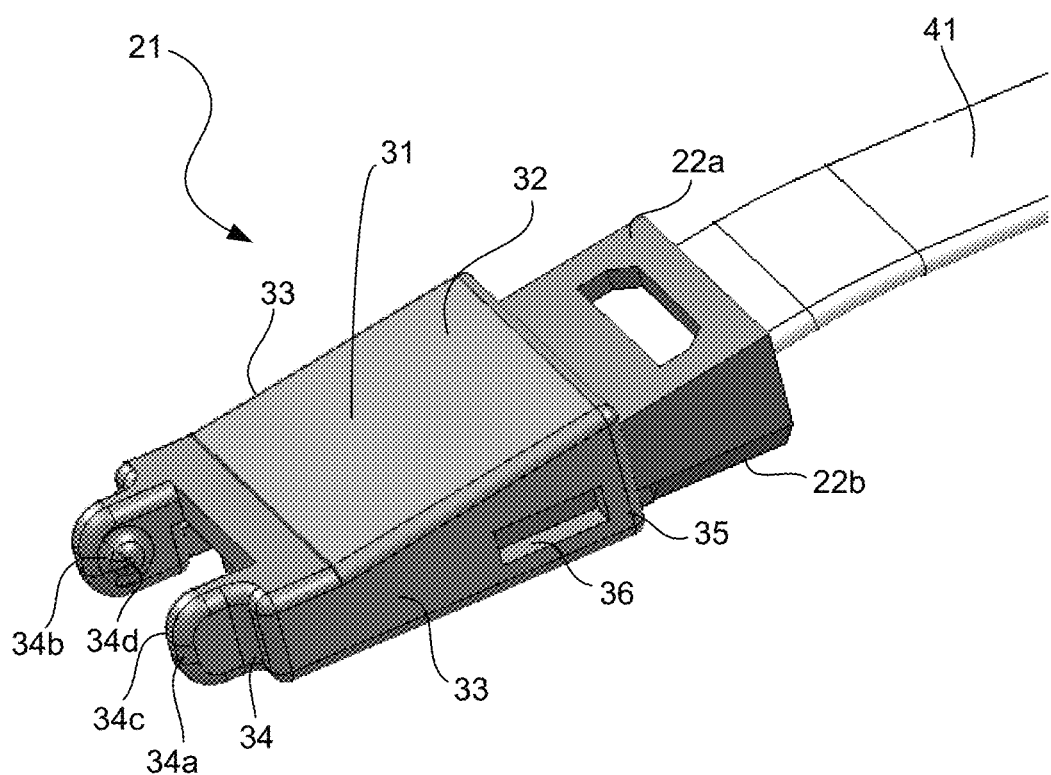
FIG. 4 illustrates a top perspective view of the MOF connector shown in FIGS. 3A and 3B with a cover secured thereto.
Figure 5:
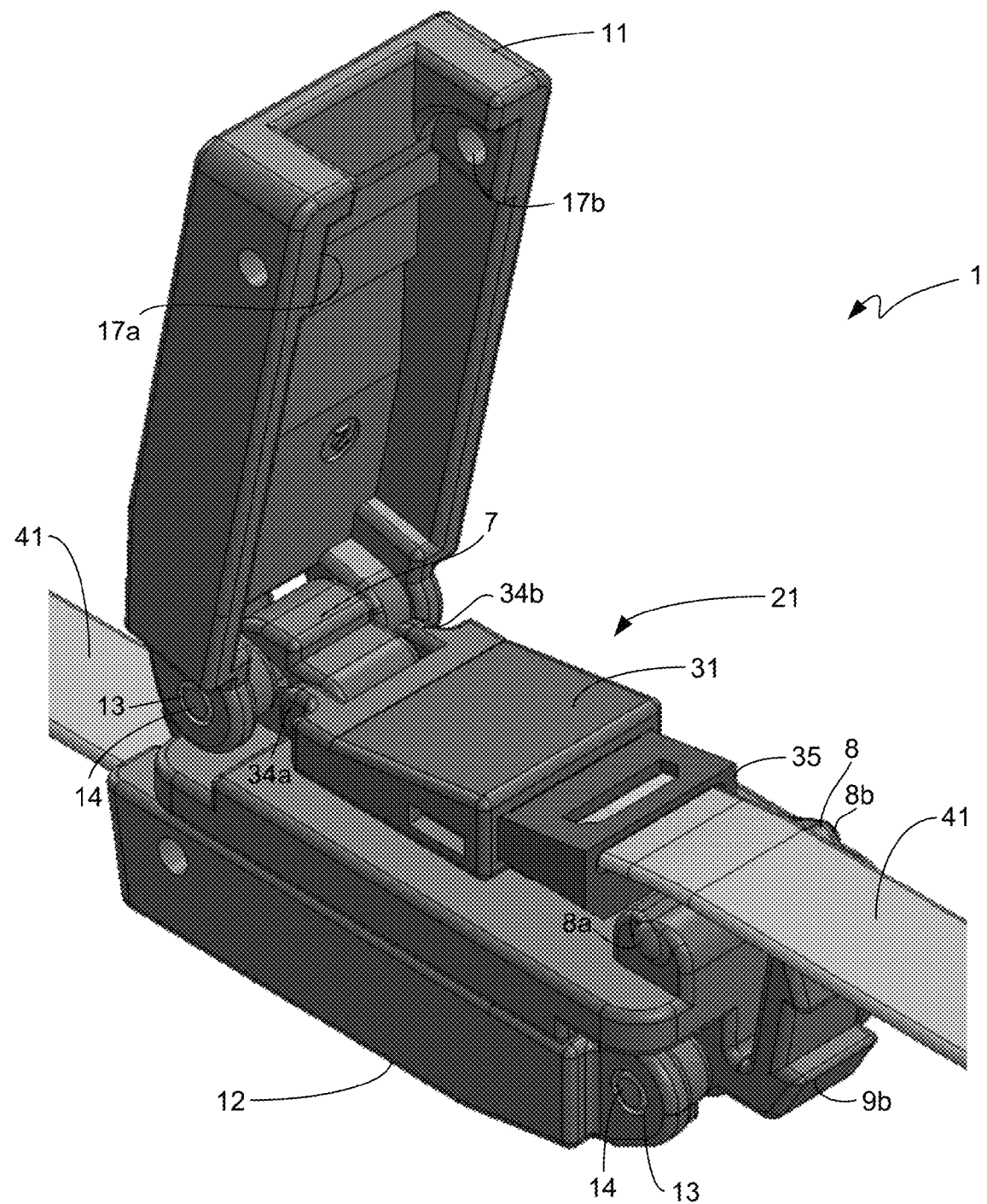
FIG. 5 illustrates a top perspective view of the adapter shown in FIG. 2B mated with first and second MOF connectors in a front-to-back relationship.
Figure 6:
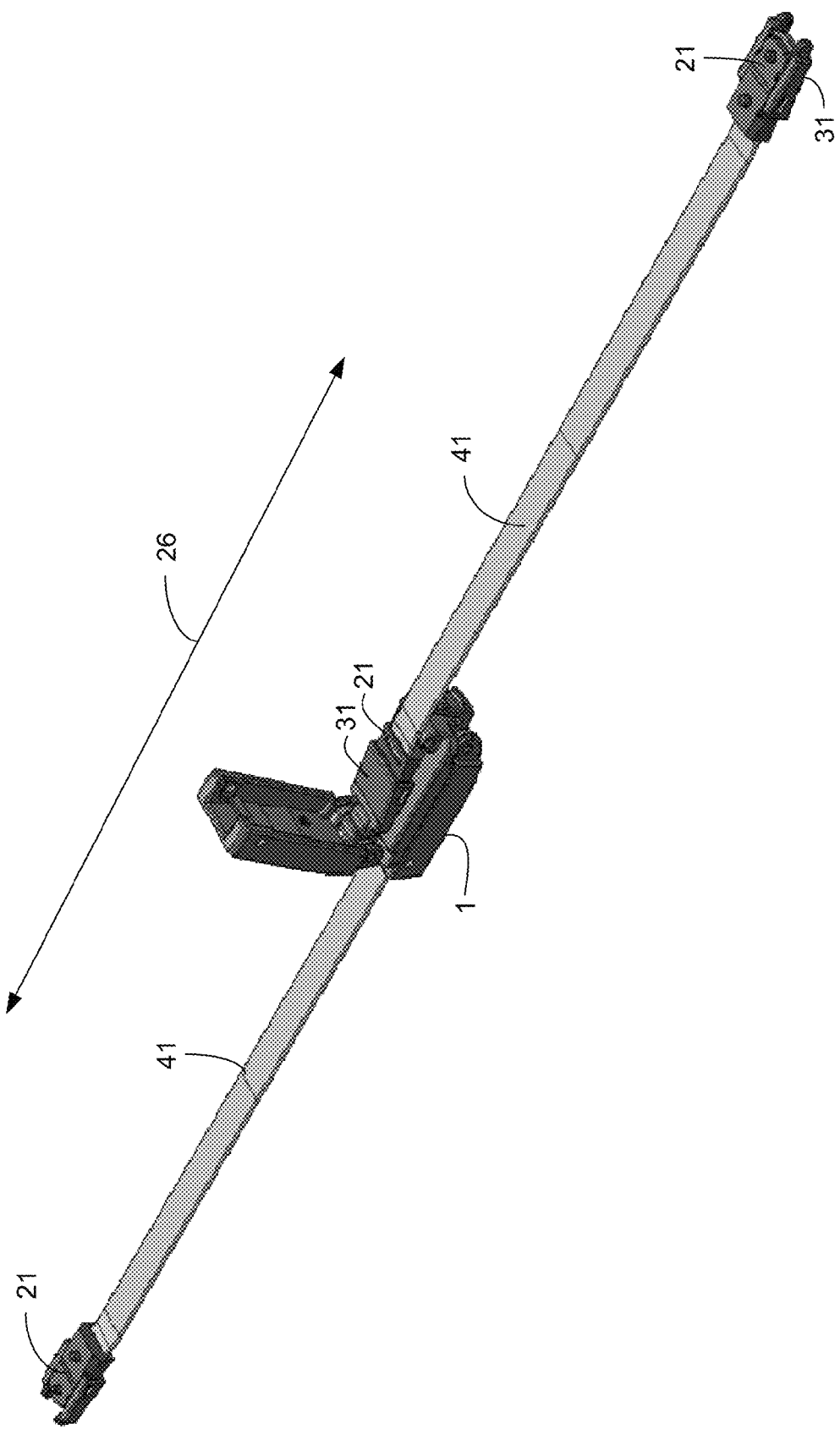
FIG. 6 illustrates a perspective view of the adapter mated with first and second MOF connectors as shown in FIG. 5, but that also shows both ends of the optical fiber cables that are terminated by the MOF connectors.

FIGS. 1A and 1B illustrate top and bottom perspective views, respectively, of an adapter 1 in accordance with an illustrative embodiment for interfacing two MOF connectors (not shown) with one another in a front-to-back arrangement. FIGS. 2A and 2B illustrate top perspective views of the adapter 1 shown in FIGS. 1A and 1B having top and bottom covers 11 and 12 pivotally secured thereto in accordance with an illustrative embodiment. In FIG. 2A, the top and bottom covers 11 and 12 are both in a closed position. In FIG. 2B, the cover 11 is in an opened position and the cover 12 is in the closed position. FIGS. 3A and 3B illustrate top and bottom perspective views, respectively, of the Prizm® connector 21 with which the adapter 1 shown in FIGS. 1A and 1B is configured to mate. FIG. 4 illustrates a top perspective view of the Prizm® connector 21 shown in FIGS. 3A and 3B with a cover 31 secured thereto. FIG. 5 illustrates a top perspective view of the adapter 1 shown in FIG. 2B fully mated with two of the Prizm® connectors 21 shown in FIG. 4, although only one of the connectors 21 can be seen in FIG. 5. FIG. 6 illustrates a perspective view of the adapter 1 with first and second Prizm® connectors 21 mated therewith in a front-to-back arrangement such that optical fiber cables 41 that are terminated by the connectors 21 are connected end-to-end in a non-overlapping relationship. A first illustrative embodiment of the adapter 1 will now be described with reference to FIGS. 1A-6.

With reference to FIGS. 1A and 1B, the adapter 1 has upper and lower mounting surfaces 2 and 3, respectively, which are generally planar surfaces that are generally parallel to one another. A side 2a of the adapter 1 that includes the upper mounting surface 2 will be referred to herein as the top side of the adapter 1. A side 3a of the adapter 1 that includes the lower mounting surface 3 will be referred to herein as the bottom side of the adapter 1. The mounting surfaces 2 and 3 are connected to one another by side walls 4. The adapter 1 has first and second ends 5 and 6, respectively, which are opposite one another.

A pivot-coupling feature 7 is formed on the first end 5 of the top side 2a of the adapter 1. The pivot-coupling feature 7 has a first pivot opening 7a and a second pivot opening 7b formed therein. A snap feature 8 is formed on the second end 6 of the adapter 1 on the top side 2a of the adapter 1. The snap feature 8 has outwardly-projecting male snap elements 8a and 8b formed thereon. The first and second ends 5 and 6, respectively, of the adapter 1 have first and second panel-connecting features 9a and 9b, respectively, formed thereon.

The bottom side 3a of the adapter 1 mirrors the top side 2a of the adapter 1 except that the locations of the pivot-coupling feature 7 and the snap feature 8 on the bottom side 3a are on the second and first ends 6 and 5, respectively, of the adapter 1, which is reversed from the locations of features 7 and 8 on the top side 2a of the adapter 1. The reversed locations of these features 7 and 8 on the top and bottom sides 2a and 3a, respectively, allow the connectors 21 (FIG. 4) to be mounted in a front-to-back relationship that allows the respective optical fiber cables 41 (FIGS. 3A-6) to be connected end-to-end in a non-overlapping relationship, as will be described below in more detail with reference to FIGS. 5 and 6.

As shown in FIGS. 2A and 2B, the adapter 1 has top and bottom covers 11 and 12, respectively, that are pivotally coupled to the pivot-coupling features 7 of the top and bottom sides 2a and 3a, respectively. The covers 11 and 12 have holes 13 formed therein that are aligned with the first pivot opening 7a of the pivot-coupling features 7. First and second dowel pins 14 pass through the holes 13 formed in the covers 11 and 12 and through the first pivot openings 7a of the pivot-coupling features 7. This arrangement allows the covers 11 and 12 to pivot about the axes of the dowel pins 14 in the directions indicated by arrows 15 and 16, respectively. The covers 11 and 12 have inwardly-projecting female snap elements 17a and 17b formed thereon, which are only visible in FIG. 2B on cover 11. The inwardly-projecting female snap elements 17a and 17b engage the outwardly-projecting male snap elements 8a and 8b, respectively, of the snap features 8 formed on the adapter 1 when the covers 11 and 12 are placed in the closed positions. In other words, the snap elements 8a and 8b snap into the snap elements 17a and 17b, respectively, in an interference fit when the covers 11 and 12 are placed in the closed positions shown in FIG. 2A. The covers 11 and 12 can be moved from the closed positions to the opened positions by exerting sufficient forces on the covers 11 and 12 in directions away from the upper and lower mounting surfaces 2a and 3a, respectively, to cause the elements 8a and 8b to disengage the elements 17a and 17b, respectively.

With reference to FIGS. 1A, 1B, 3A, 3B, 5, and 6, the adapter 1 has guide holes 18a and 18b formed therein that pass through the adapter 1 and through the upper and lower mounting surfaces 2 and 3. The connector 21 has guide pins 23a and 23b formed on a lower surface 22a thereof. For the connector 21 that is mounted on the top side 2a of the adapter 1, the guide pins 23a and 23b are mated with the guide holes 18a and 18b, respectively. For the connector 21 that is mounted on the bottom side 3a of the adapter 1, the guide pins 23a and 23b are mated with the guide holes 18b and 18a, respectively. Thus, the connectors 21 that are mounted on the upper and lower mounting surfaces 2 and 3, respectively, of the adapter 1 are in a front-to-back arrangement, or relationship, in that the front and back ends 24 and 25, respectively, of the connector 21 that is mounted on the upper mounting surface 2 are position over the back and front ends 25 and 24, respectively, of the connector 21 that is mounted on the lower mounting surface 3. In this mounted relationship of the connectors 21, the optical fiber cables 41 are connected end-to-end in a non-overlapping relationship that extends the length of the portion of the link comprising the adapter 1, the connectors 21 and the cables 41 in the directions indicated by arrow 26 in FIG. 6. A window 19 extends through the adapter 1, with one side of the window 19 being on the upper mounting surface 2 and with the opposite side of the window 19 being on the lower mounting surface 3.

With reference to FIGS. 3A-4, the connector 21 has a cover 31 secured thereto. The cover 31 has a top 32, sides 33, a front end 34, and a back end 35. Inner surfaces (not shown) of the sides 33 of the cover 31 are sized, shaped and located to engage outer surfaces 27 (FIG. 3B) of the connector 21 in an interference fit that secures the cover 31 to the connector 21 in the relationship shown in FIG. 4. The outer surfaces 27 of the connector 21 include catches 27a that engage respective latch features (not shown) formed on the inner surfaces of the sides 33 of the cover 31. The interference fit can be overcome to remove the cover 31 from the connector 21 by applying a sufficient force to the cover 21 in a direction away from the connector 21. Extraction features 36 formed in the sides 33 of the cover 31 are provided for receiving ends of an extraction tool (e.g., tweezers), which may then be used to apply a force to the cover 31 to extract it from the connector 21.

The connector 21 has an opening formed in the back end 25 thereof that extends through to a compartment 28 of the connector 21. The compartment 28 is defined by a front wall 28a, side walls 28b and a bottom 28c. The fibers 41a of the cable 41 pass through the opening formed in the back end 25 of the connector and abut the front walls 28a of the compartment 28. The connector 21 is made of a molded plastic material that is transparent to the operating wavelength of the optical signals being carried on the fibers 41a. The opposite side of the front wall 28a has an array of lenses 29 formed therein that are equal in number to the number of optical fibers 41a of the cable 41. Depending on whether a respective fiber 41a is transmitting or receiving, the respective lens 29 either receives the optical signal passing out of the end of the fiber 41a and reflects it at the non-zero-degree angle in the direction indicated by arrow 51 (FIG. 3A) out of a facet 52 (FIG. 3B) of the connector 21 or receives an optical signal propagating in the direction indicated by arrow 53 (FIG. 3A) through the facet 52 and reflects it at the non-zero-degree angle into the end of the respective optical fiber 41a. Thus, the facet 52 may operate as an input facet of the connector 21 or as an output facet of the connector 21. The cover 31 of the connector 21 covers the compartment 28 and the lenses 29 to prevent dust, dirt and other debris from entering the optical pathways that extend from the ends of the optical fibers 41a to the lenses 29. The front end 34 of the cover 31 has first and second arms 34a and 34b extending therefrom that have male coupling elements 34c and 34d thereon, respectively.

With reference to FIGS. 1A, 1B, 3A, 3B, 4, and 5, these male coupling elements 34c and 34d of the connector cover 31 are received in opposite ends of the second pivot opening 7b of the pivot coupling feature 7 prior to the guide pins 23a and 23b of the connector 21 being received in the guide holes 18a and 18b, respectively, or in the guide holes 18b and 18a, respectively, depending on whether the connector 21 is being mounted on the upper mounting surface 2 of the adapter 1 or on the lower mounting surface 3 of the adapter 1. After the male coupling elements 34c and 34d are received in opposite ends of the second pivot opening 7b of the pivot coupling feature 7, the connector 21 is pivoted toward the adapter 1 until the guide pins 23a and 23b are received in the guide holes 18a and 18b, respectively, or in the guide holes 18b and 18a, respectively, depending on whether the connector 21 is being mounted on the upper or lower mounting surfaces 2 and 3, respectively, of the adapter 1.

Once the connectors 21 have been mounted on the respective mounting surfaces 2 and 3 in this manner, the respective covers 11 and 12 of the adapter 1 may be placed in the closed positions. When the covers 11 and 12 of the adapter 1 are in the closed positions, they protect the adapter 1 and the connectors 21 mounted thereon from being damaged by handling or other external factors. The covers 11 and 12 also prevent dust, dirt, debris, and other contaminants from entering the optical pathways that extend in between the facets 52 of the connectors 21 through the window 19 formed in the adapter 1. When the connectors 21 are mounted on the upper and lower mounting surfaces 2 and 3, the window 19 formed in the adapter 1 is precisely aligned with the facets 52 of the connectors 21. Thus, the optical signals passing out of the facet 52 of the transmitting connector 21 will pass through the window 19 and into the facet 52 of the receiving connector 21.

The lenses 29 of the connectors 21 also perform a collimating function in addition to performing the aforementioned reflecting function. Therefore, the optical signals passing out of the facet 52 of the transmitting connector 21 are collimated light beams that do not diverge as they pass through window 19 and into the facet 52 of the receiving connector 21. Consequently, no optical operations need to be performed by the window 19 other than simply passing the collimated light beams. Therefore, the window 19 can be merely an opening that is precisely formed and located and that extends through the adapter 1 from the upper mounting surface 2 to the lower mounting surface 3. To prevent dust, debris, dirt or other contaminants from entering the window 19, the window 19 is typically covered at the upper and lower mounting surfaces 2 and 3 with a material (e.g., plastic or glass) that is transparent to the operating wavelength of the optical signals.

The combination of the connector cover 31 and the adapter covers 11 and 12 ensures that dust, debris, dirt or other contaminants will not enter the optical pathways that extend between the ends of the fibers 41a held in one of the connectors 21 and the ends of the fibers 41a held in the other connector 21. The covers 11, 12 and 31 also prevent the connectors 21 and the adapter 1 from being damaged external forces, such as those associated with handling by humans.

It can be seen that the lower and upper surfaces 22a and 22b, respectively, of the connector 21 (FIGS. 3A-4) are not parallel to one another, but are at a non-zero-degree angle to one another. For this particular connector 21, this non-zero-degree angle is 12°. When the connector 21 is mounted on the upper or lower mounting surfaces 2 or 3, respectively, of the adapter 1 (FIGS. 1A and 1B), the lower surface 22a of the connector is in contact with the mounting surface 2 or 3 of the adapter 1. The bottom 28c of the compartment 28 (FIG. 3A) of the connector 21 is parallel to the upper surface 22b of the connector 21. Thus, the longitudinal axes of the fibers 41a (FIG. 3A) are also at a 12° angle relative to the lower surface 22a of the connector 21. Therefore, the non-zero-degree angle by which the optical pathways of the connector 21 are bent in between the ends of the fibers 41a and the facet 52 of the connector 21 is 90°+12°=102°.

The connector 21, in accordance with this illustrative embodiment, has twelve optical channels and holds the ends of twelve optical fibers 41a. In the transmitting connector 21, the twelve lenses 29 reflect the respective optical signals by an angle of 102° in directions toward the output facet 52. The lenses 29 also collimate the optical signals into respective collimated light beams. The collimated light beams pass out of the output facet 52, through the window 19 (FIGS. 1A and 1B) of the adapter 1 and into the input facet 52 of the connector mounted on the opposite side of the adapter 1. The lenses 29 of that connector 21 receive the respective collimated light beams that pass through the input facet 52 and reflect them and an angle of 102° into the respective ends of the optical fibers 41a held in that connector 21.

Figure 7A:
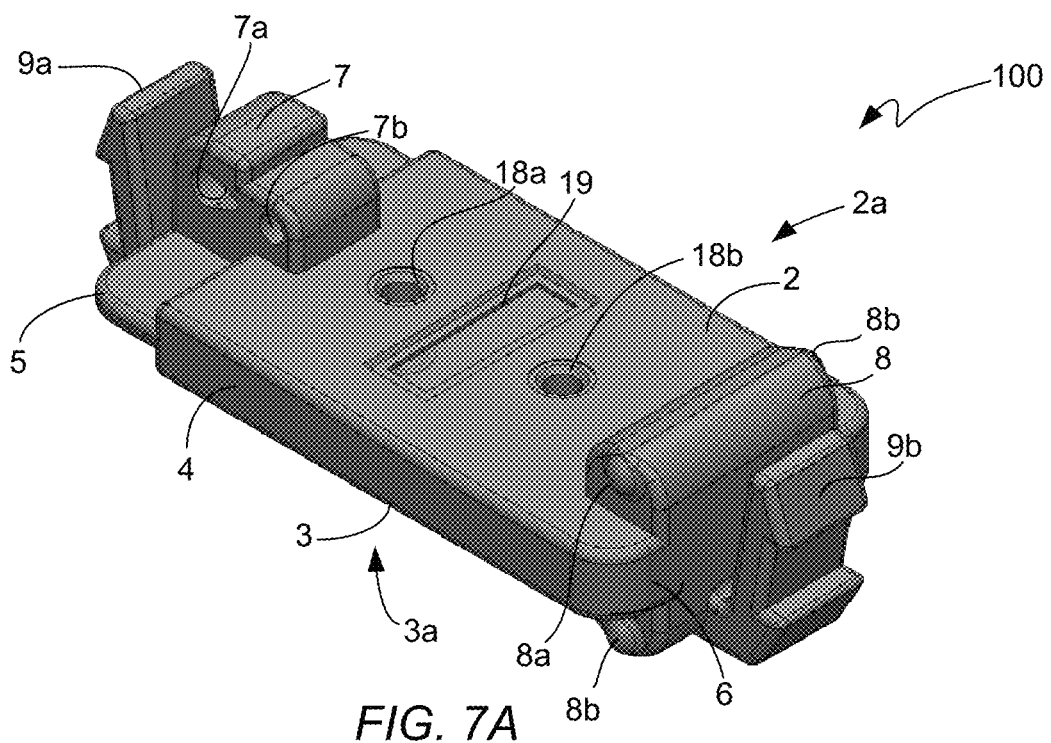
FIGS. 7A and 7B illustrate top and bottom perspective views of an adapter in accordance with an illustrative embodiment for interfacing two MOF connectors in a front-to-front arrangement.
Figure 7B:
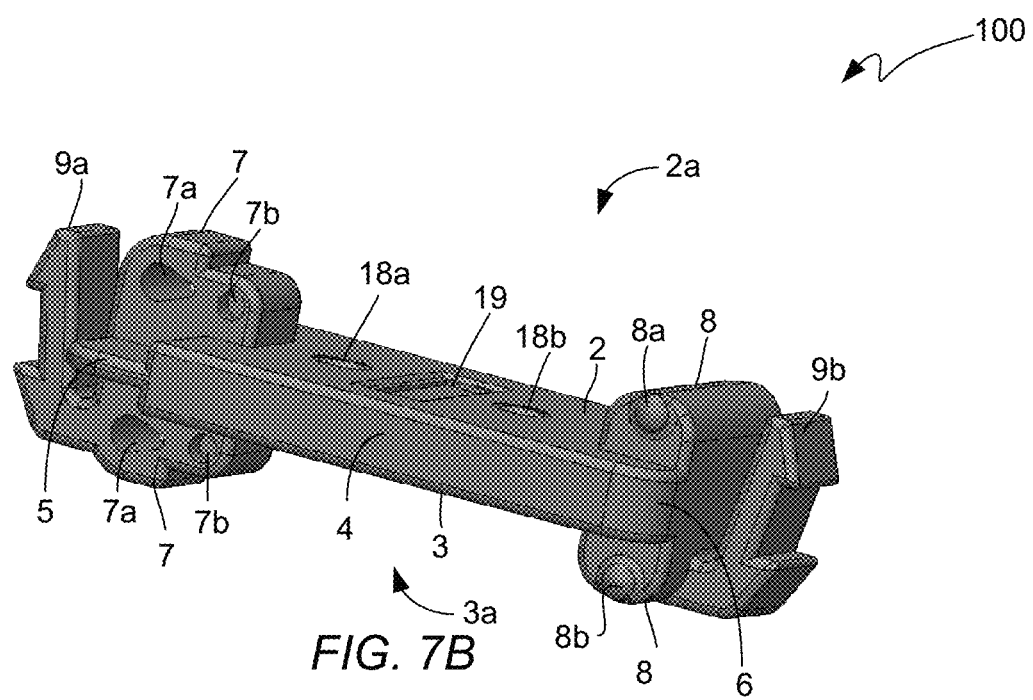
Figure 8A:
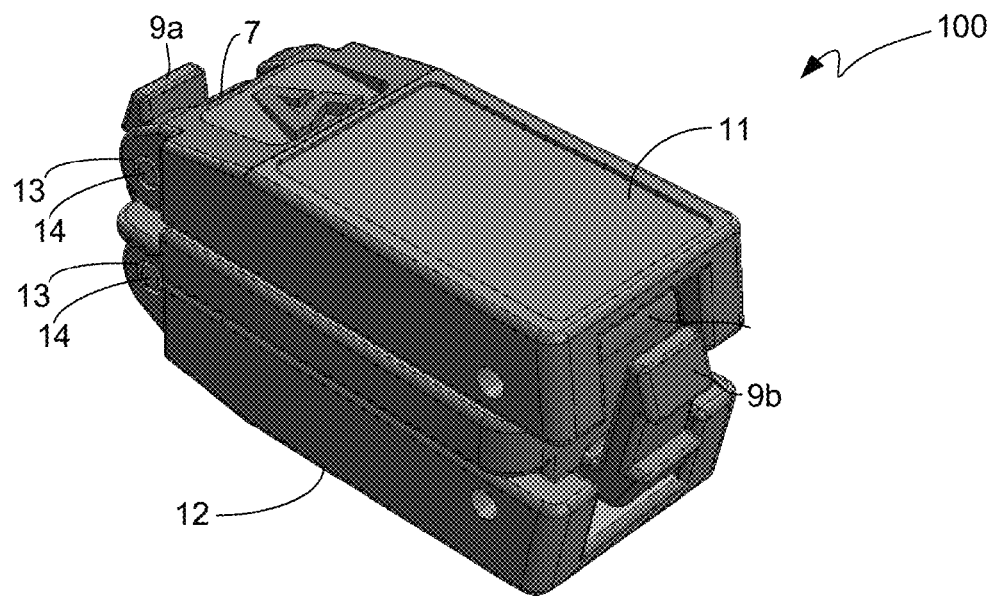
FIGS. 8A and 8B illustrate top perspective views of the adapter shown in FIGS. 7A and 7B having top and bottom covers pivotally secured thereto in accordance with an illustrative embodiment.
Figure 8B:
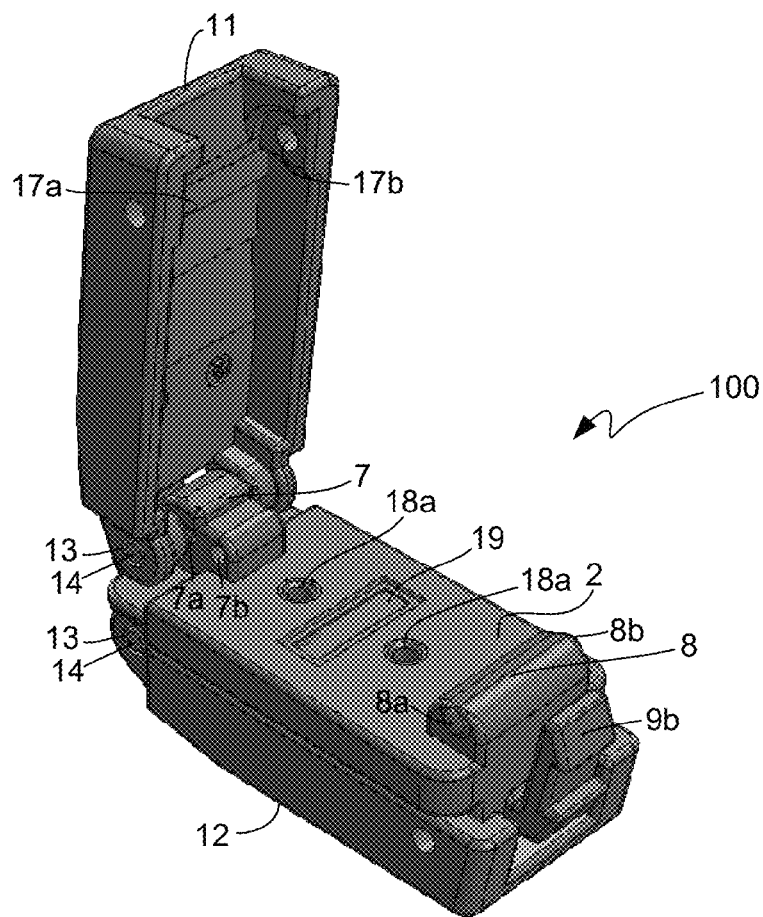
Figure 9:
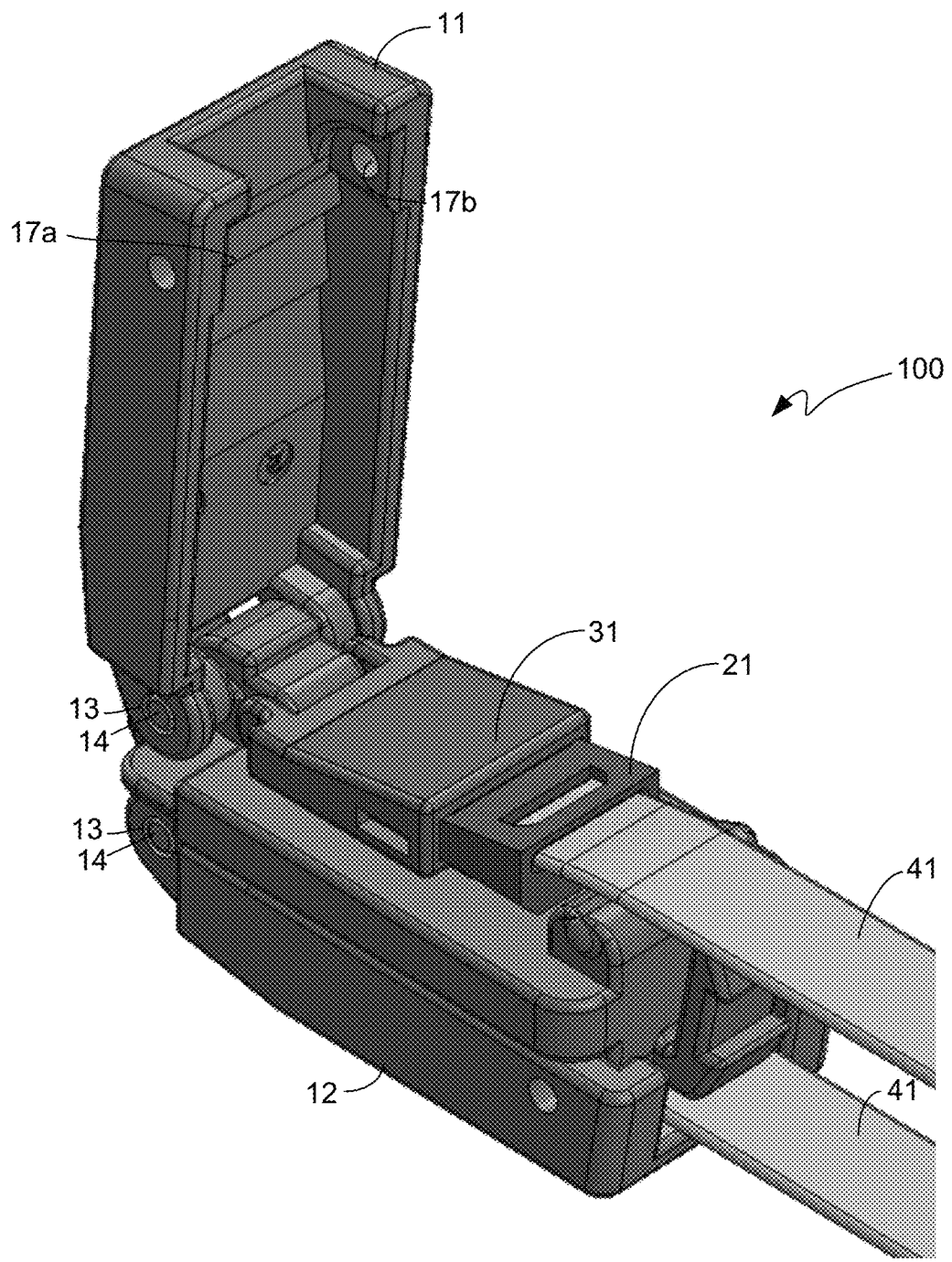
FIG. 9 illustrates a perspective view of the adapter shown in FIG. 8B mated with first and second MOF connectors in a front-to-front arrangement.
Figure 10:
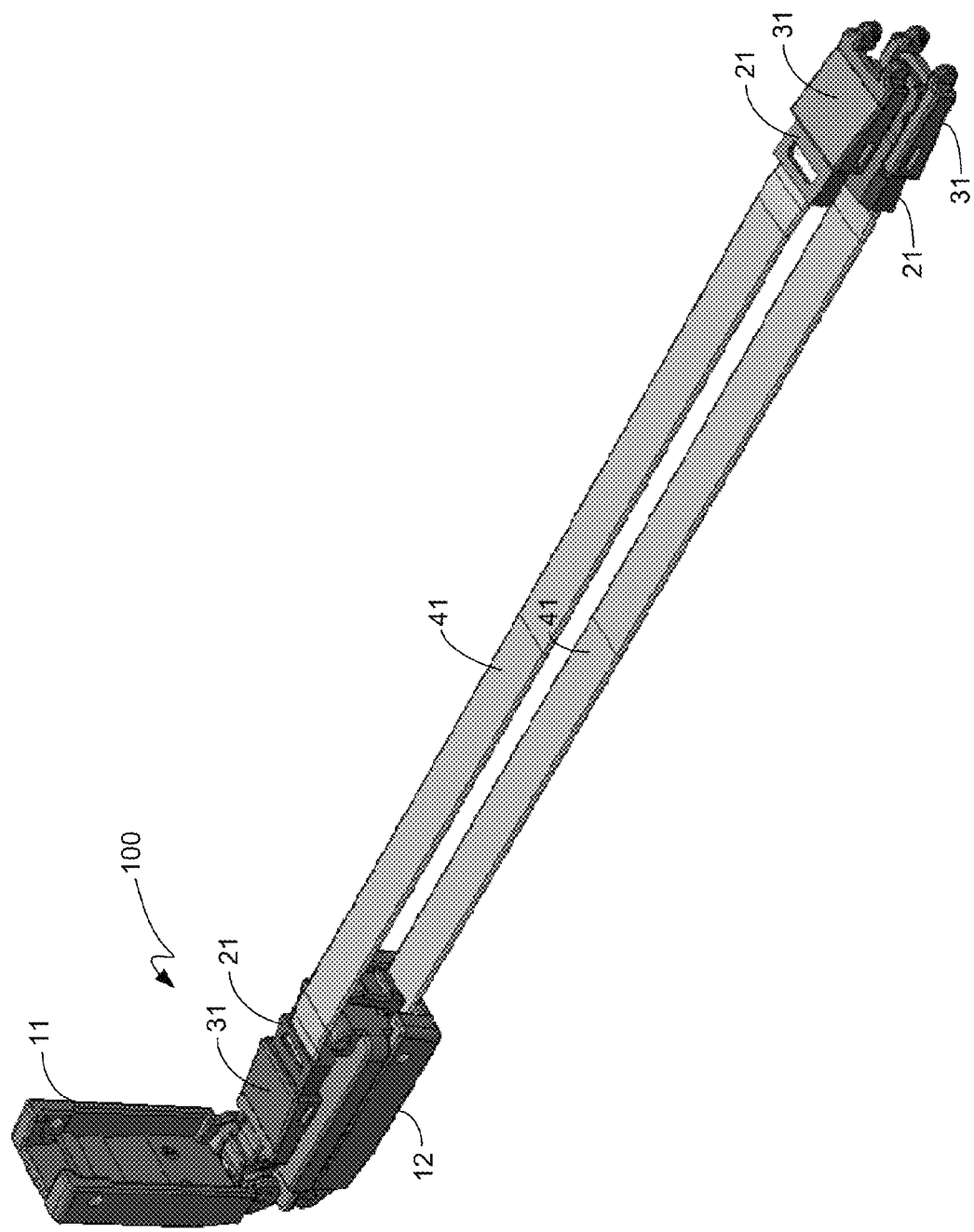
FIG. 10 illustrates a perspective view of the adapter mated with the first and second MOF connectors as shown in FIG. 9, but that also shows both ends of the optical fiber cables that are terminated by the MOF connectors.

FIGS. 7A and 7B illustrate top and bottom perspective views of an adapter 100 in accordance with another illustrative embodiment for interfacing two of the connectors 21 in a front-to-front arrangement. FIGS. 8A and 8B illustrate top perspective views of the adapter 100 shown in FIGS. 7A and 7B having top and bottom covers 11 and 12 pivotally secured thereto in accordance with an illustrative embodiment. In FIG. 8A, the covers 11 and 12 are in the closed positions. In FIG. 8B, the cover 11 is in the opened position and the cover 12 is in the closed position. FIG. 9 illustrates a perspective view of the adapter 100 shown in FIG. 8B mated with first and second connectors 21 in a front-to-front arrangement. In FIG. 9, only the top connector 21 is visible. FIG. 10 illustrates a perspective view of the adapter 100 shown in FIG. 9 mated with first and second connectors 21 and shows the respective optical fiber cables 41. In the front-to-front arrangement shown in FIG. 10, the optical fiber cables 41 overlap and the ends of the cables 41 that extend away from the adapter 100 are also terminated by connectors 21.

The adapter 100 shown in FIGS. 7A-10 is identical to the adapter 1 shown in FIGS. 1A-2B except that the adapter 100 has both of the pivot-coupling features 7 located on the first end 5 of the adapter 100 and has both of the snap features 8 located on the second end 6 of the adapter 100. Locating the features 7 and 8 on the first and second ends 5 and 6, respectively, enables the connectors 21 to be mounted in the front-to-front arrangement shown in FIG. 10. The covers 11 and 12 of the adapter 100 open and close in the same manner in which the covers 11 and 12 of the adapter 1 open and close. The front-to-front arrangement shown in FIG. 6 results in the fiber channels being flipped. For example, in the illustrative embodiment in which there are twelve channels in each connector 21, the front-to-front arrangement shown in FIG. 6 results in the optical signals of channels 1-12 of the transmitting connector 21 being received on channels 12-1, respectively, of the receiving connector 21. In contrast, the front-to-back arrangement shown in FIG. 10 results in the optical signals of channels 1-12 of the transmitting connector 21 being received on channels 1-12, respectively, of the receiving connector 21. In all other respects, the adapters 1 and 100 perform the same functions and operate in the same manner.

Figure 11:
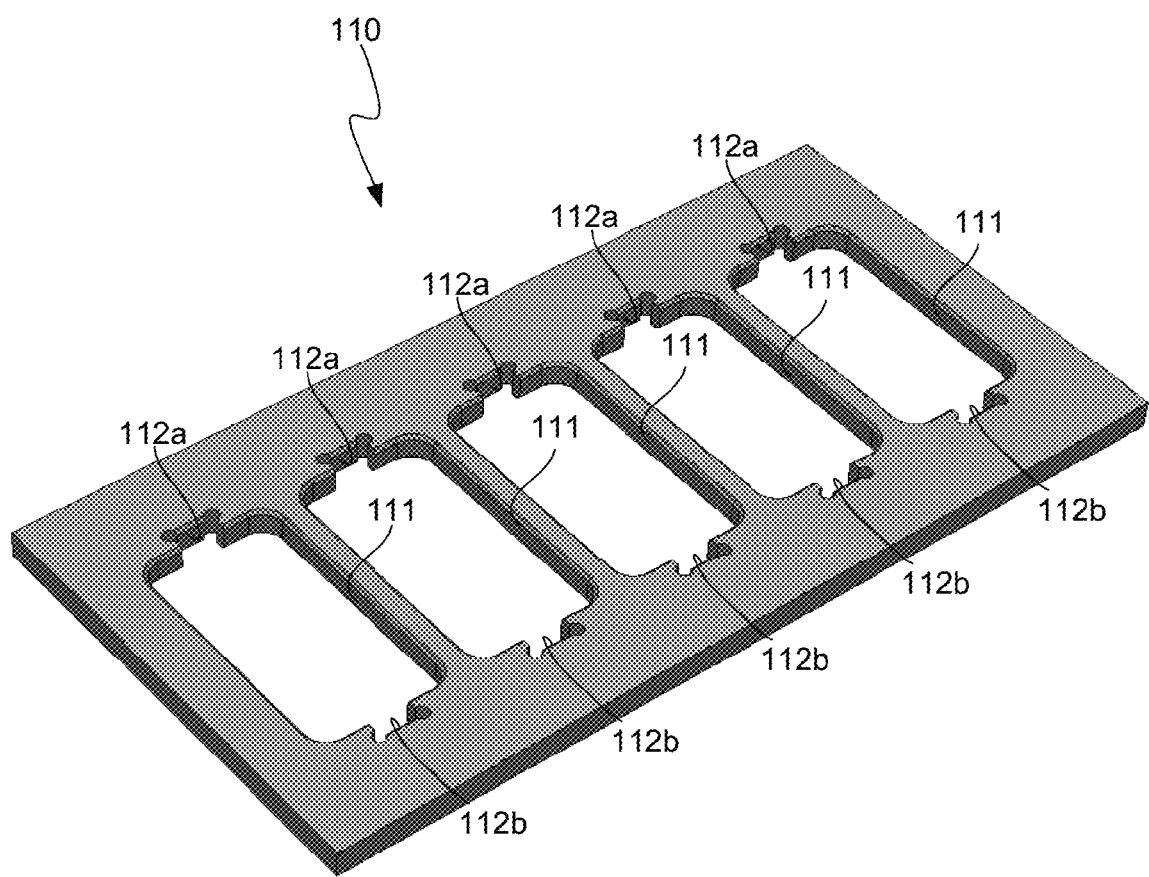
FIG. 11 illustrates a top perspective view of a plate or panel that has a plurality of openings formed therein that are adapted to receive one the adapters shown in 2B or 8B.
Figure 12:
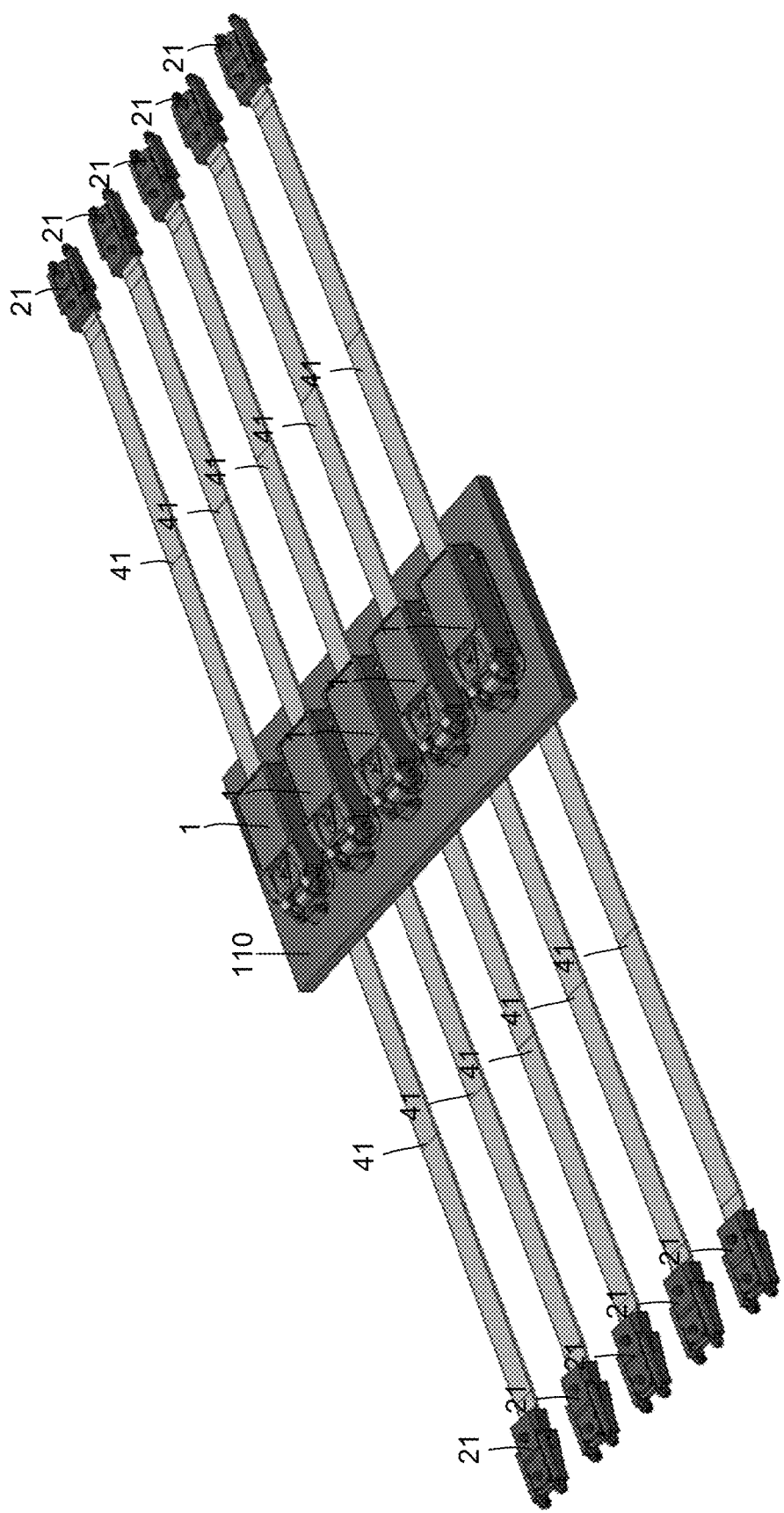
FIG. 12 illustrates a top perspective view of the plate or panel shown in FIG. 11 having a plurality of the adapters shown in FIG. 6 mounted thereon, each of which has two of the MOF connectors shown in FIG. 4 mounted thereon in a front-to-back arrangement.
Figure 13:
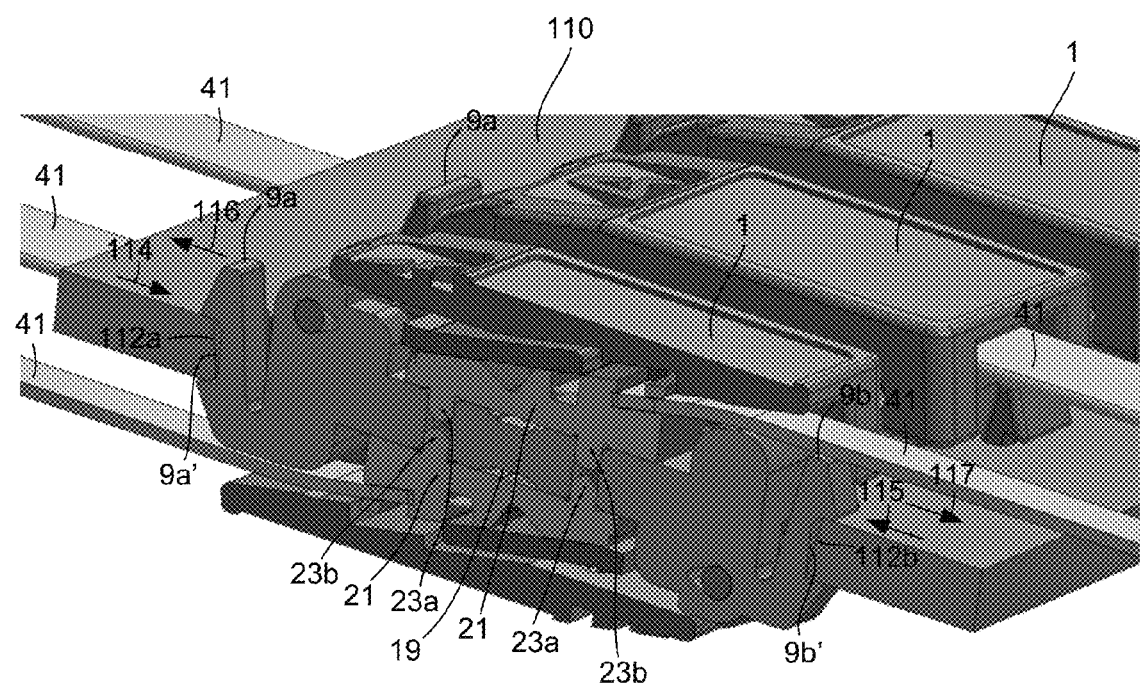
FIG. 13 illustrates a side cross-sectional perspective view of the plate or panel shown in FIG. 12 with the adapters mounted thereon.

FIG. 11 illustrates a top perspective view of a plate or panel 110 that has a plurality (five) of panel openings 111 formed therein, each being adapted, or configured, to receive one the adapters 1 shown in 2B. FIG. 12 illustrates a top perspective view of the plate or panel 110 shown in FIG. 11 having a plurality of the adapters 1 mounted thereon, each of which has two of the connectors 21 mounted thereon. FIG. 13 illustrates a side cross-sectional perspective view of the plate or panel 110 shown in FIG. 12 with the adapters 1 mounted thereon and with the connectors 21 mounted on the adapters 1.

With reference to FIGS. 1A, 1B and 11-13, the first and second panel-connecting features 9a and 9b, respectively, have first and second slots 9a' and 9b' formed therein, respectively, that are shaped and sized to receive the edges 112a and 112b, respectively, of the panel openings 111. The adapter 1 is typically made of a molded plastic material that is generally rigid, but that has some flexibility, at least in the first and second panel-connecting features 9a and 9b. In order to insert the adapters 1 into the respective panel openings 111, the features 9a and 9b are pressed inwardly in the directions of arrows 114 and 115 (FIG. 13) as the adapters 1 with the connectors 21 mounted thereon are inserted into the respective openings 111. Once the adapters 1 have been inserted into the panel openings 111, the inward forces represented by arrows 114 and 115 are removed, which allows the features 9a and 9b to move in the outward directions indicated by arrows 116 and 117 (FIG. 13) to return to their non-compressed states shown in FIG. 13. In the non-compressed states, the slots 9a' and 9b' are in an interference fit with the edges 112a and 112b, respectively, of the panel openings 111. These interference fits prevent the adapters 1 from being dislodged from the openings 111.

Figure 14:
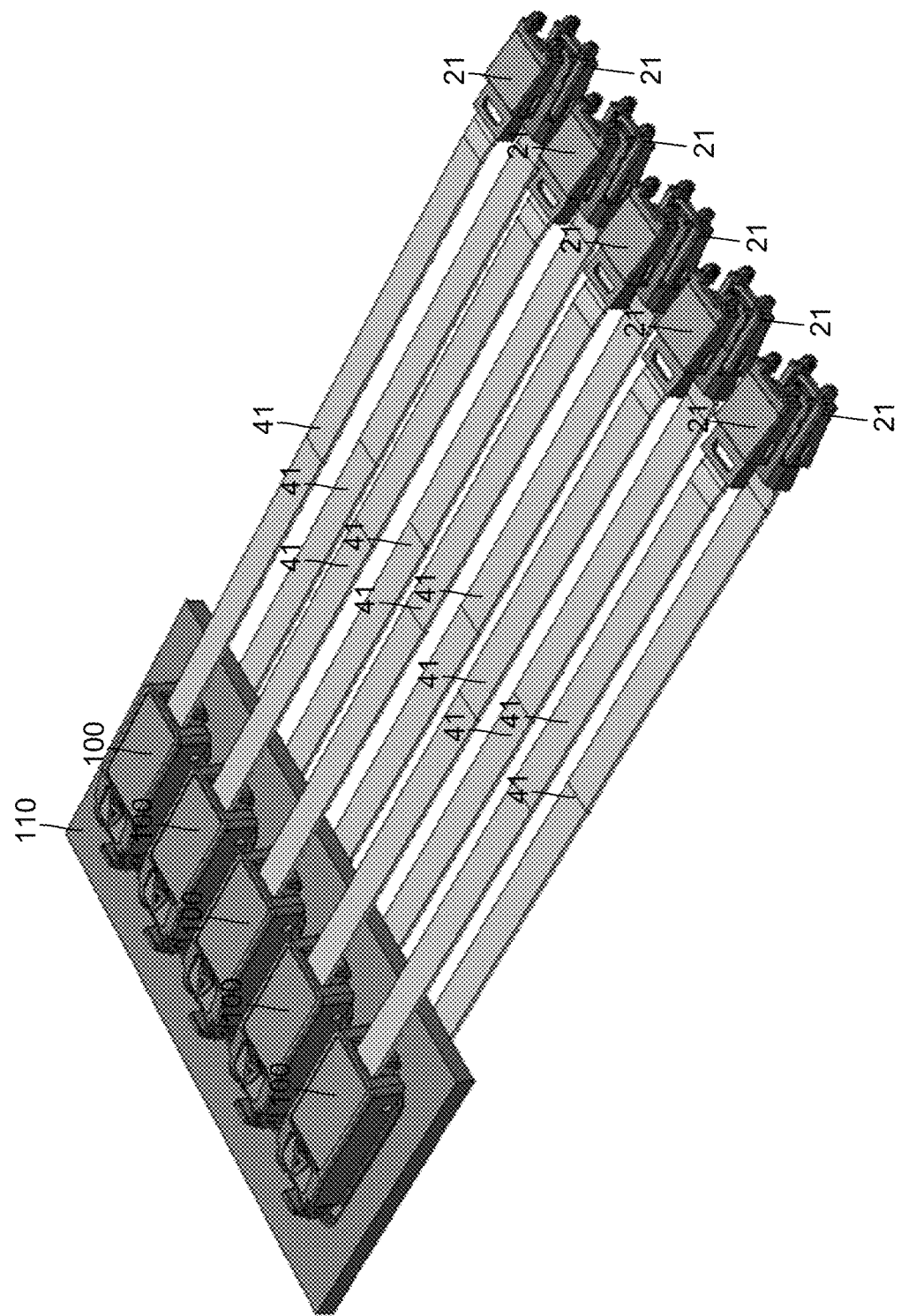
FIG. 14 illustrates a top perspective view of the plate or panel shown in FIG. 11 having a plurality of the adapters shown in FIG. 10 mounted thereon, each of which has two of the MOF connectors shown in FIG. 4 mounted thereon in a front-to-front arrangement.
Figure 15:
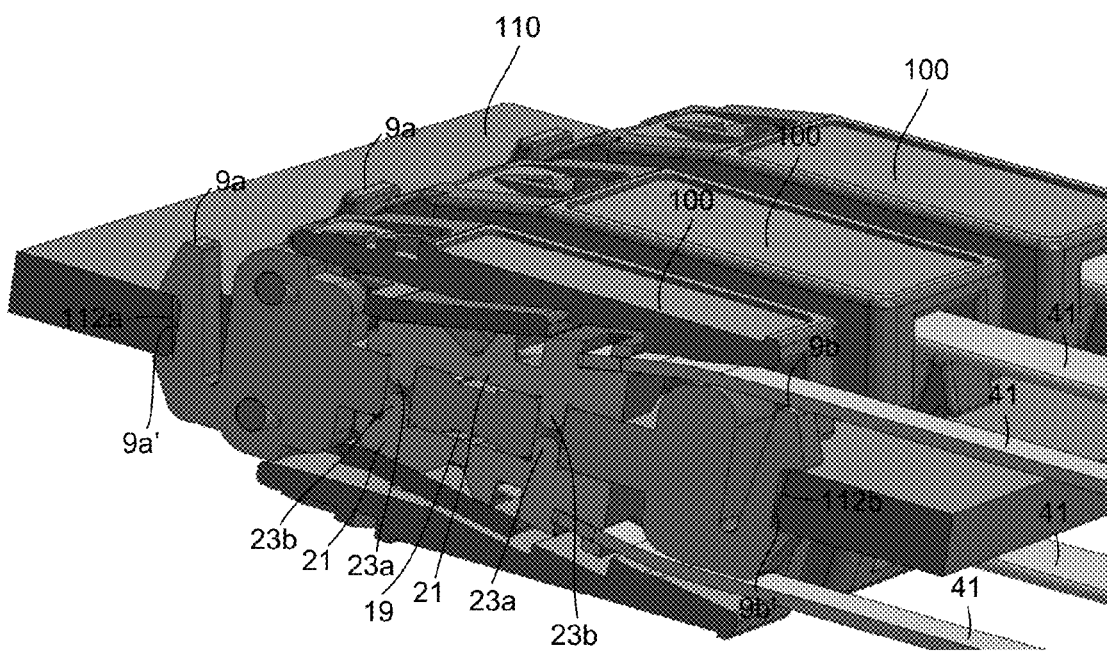
FIG. 15 illustrates a side cross-sectional perspective view of the plate or panel shown in FIG. 14 with the adapters mounted thereon.

FIG. 14 illustrates a top perspective view of the panel 110 shown in FIG. 11 with a plurality of the adapters 100 shown in 9 mounted on it. FIG. 15 illustrates a side cross-sectional perspective view of the panel 110 with the adapters 100 mounted thereon and with the connectors 21 mounted on the adapters 100. The adapters 100 mate with the panel 110 in the same manner in which the adapters 1 mate with the panel 110, as described above in detail with reference to FIGS. 1A, 1B and 11-13.

The panel assemblies shown in FIGS. 12 and 14 may be used to provide optical interconnections in a variety of applications. As indicated above, the adapters 1 and 100 allow optical fiber cables that are terminated with MOF connectors to be cascaded while either maintaining the order of the channels or flipping the order of the channels. In addition, the adapter covers 11 and 12 and the connector cover 31 protect the adapters 1 and 100 and the connectors 21 from being damaged and prevent particles from entering the optical pathways and degrading performance. It should be noted, however, that the covers 11, 12 and 31 are not needed in all cases and need not be included in cases where they are not needed. It should also be noted that the configurations of the adapters 1 and 11 and of the connector 21 may be different from the configurations described above and shown in the figures. Those skilled in the art will understand that many modifications may be made to the embodiments described herein within the scope of the invention.

It should be noted that the invention has been described with respect to illustrative embodiments for the purpose of describing the principles and concepts of the invention. The invention is not limited to these embodiments. Many variations may be made to these embodiments within the scope of the invention, and as will be understood by those skilled in the art in view of the description being provided herein, such variations are within the scope of the invention.

What is claimed is:

1. An adapter for optically interfacing a first multi-optical fiber (MOF) connector with a second MOF connector, the first and second MOF connectors being identical in type and having first and second optics systems, respectively, that bend light at non-zero-degree angles, the adapter comprising:
    a first mounting surface disposed on a first side of the adapter, the first side of the adapter having at least one mating feature thereon for mating with at least one mating feature of the first MOF connector, wherein an optical window of the adapter passes through the first mounting surface, wherein when said at least one mating feature of the first mounting surface is mated with said at least one mating feature of the first MOF connector, a first optical facet of the first MOF connector is adjacent to and aligned with the optical window; and
    a second mounting surface disposed on a second side of the adapter opposite the first mounting surface, the second side of the adapter having at least one mating feature thereon for mating with at least one mating feature of the second MOF connector, wherein the optical window passes through the second mounting surfaces such that the first and second mounting surfaces are optically interconnected by the optical window, wherein when said at least one mating feature of the second side is mated with said at least one mating feature of the second MOF connector, a second optical facet of the second MOF connector is adjacent to and aligned with the optical window and with the first optical facet of the first MOF connector to allow optical signals to be optically coupled between the facets of first and second MOF connectors via the optical window of the adapter.

2. The adapter of claim 1, wherein the first and second MOF connectors each have a plurality of optical pathways, the first MOF connector is connected to proximal ends of a first plurality of optical fibers, and wherein the second MOF connector is connected to proximal ends of a second plurality of optical fibers, and wherein light passing out of the proximal ends of the first plurality of optical fibers is reflected by an optics system of the first parallel optical connector module at a non-zero angle toward the first facet of the first MOF connector and passes through the optical window of the first facet, through the optical window of the adapter, through the second facet of the second MOF connector, and wherein an optics system of the second MOF connector reflects the light that enters therein through the second facet by the non-zero angle into the proximal ends of the second plurality of optical fibers.

3. The adapter of claim 2, wherein said at least one mating feature of the first side of the adapter is a first pair of guide holes and wherein said at least one mating feature of the first MOF connector is a first pair of guide pins that are shaped and sized to mate with the first pair of guide pins, and wherein said at least one mating feature of the second side is a second pair of guide holes and wherein said at least one mating feature of the second MOF connector is a second pair of guide pins that are shaped and sized to mate with the second pair of guide holes.

4. The adapter of claim 3, wherein the first and second mounting surfaces are parallel to one another.

5. The adapter of claim 3, wherein the guide holes of the first pair of guide holes have axes that are normal to the first mounting surface of the adapter, and wherein the guide holes of the second pair of guide holes have axes that are normal to the second mounting surface of the adapter.

6. The adapter of claim 2, wherein the first and second MOF connectors include first and second connector dust covers, respectively.

7. The adapter of claim 6, wherein the adapter includes first and second adapter dust covers, the first adapter dust cover being pivotally coupled to the adapter by a first pivot-coupling feature disposed on the first side of the adapter on a first end of the adapter, and wherein the first pivot-coupling feature enables the first adapter dust cover to be pivoted from a closed position into an opened positioned and from the opened position into the closed position, wherein in the closed position, the first MOF connector is encapsulated in between inner surfaces of the first adapter dust cover and the first mounting surface, and wherein the second adapter dust cover is pivotally coupled to the adapter by a second pivot-coupling feature disposed on the second side of the adapter on a second end of the adapter, and wherein the second pivot-coupling feature enables the second adapter dust cover to be pivoted from a closed position into an opened positioned and from the opened position into the closed position, wherein in the closed position of the second adapter dust cover, the second MOF connector is encapsulated in between inner surfaces of the second adapter dust cover and the second mounting surface.

8. The adapter of claim 7, wherein the first pivot-coupling feature is also configured to pivotally couple to the first connector dust cover to assist in mounting the first MOF connector on the first mounting surface, and wherein the second pivot-coupling feature is also configured to pivotally couple to the second connector dust cover to assist in mounting the second MOF connector on the second mounting surface.

9. The adapter of claim 6, wherein the adapter includes first and second adapter dust covers, the first adapter dust cover being pivotally coupled to the adapter by a first pivot-coupling feature disposed on the first side of the adapter on a first end of the adapter, and wherein the first pivot-coupling feature enables the first adapter dust cover to be pivoted from a closed position into an opened positioned and from the opened position into the closed position, wherein in the closed position, the first MOF connector is encapsulated in between inner surfaces of the first adapter dust cover and the first mounting surface, and wherein the second adapter dust cover is pivotally coupled to the adapter by a second pivot-coupling feature disposed on the second side of the adapter on the first end of the adapter, and wherein the second pivot-coupling feature enables the second adapter dust cover to be pivoted from a closed position into an opened positioned and from the opened position into the closed position, wherein in the closed position of the second adapter dust cover, the second MOF connector is encapsulated in between inner surfaces of the second adapter dust cover and the second mounting surface.

10. The adapter of claim 9, wherein the first pivot-coupling feature is also configured to pivotally couple to the first connector dust cover to assist in mounting the first MOF connector on the first mounting surface, and wherein the second pivot-coupling feature is also configured to pivotally couple to the second connector dust cover to assist in mounting the second MOF connector on the second mounting surface.

11. The adapter of claim 1, wherein said at least one mating feature of the first side of the adapter is a first pair of guide holes and wherein said at least one mating feature of the first MOF connector is a first pair of guide pins that are shaped and sized to mate with the first pair of guide pins, and wherein the first MOF connector is a Prizm® connector, and wherein said at least one mating feature of the second side is a second pair of guide holes and wherein said at least one mating feature of the second MOF connector is a second pair of guide pins that are shaped and sized to mate with the second pair of guide holes, and wherein the second MOF connector is a Prizm® connector.

12. A method for optically interfacing a first multi-optical fiber (MOF) connector with a second MOF connector, the adapter assembly comprising:
    providing an adapter that is configured to optically interface the first and second MOF connectors with one another, the adapter having a first mounting surface disposed on a first side thereof and having a second mounting surface disposed on a second side thereof opposite the first mounting surface, the adapter having an optical window formed therein that passes through the adapter and through the first and second mounting surfaces;
    mounting the first MOF connector on the first mounting surface such that at least one mating feature on the first side of the adapter is mated with at least one mating feature of the first MOF connector, the first MOF connector having a first optical facet that is adjacent to and aligned with the optical window, the first MOF connector having proximal ends of a first plurality of optical fibers secured thereto, the proximal ends being adjacent a first optics system of the first MOF connector, wherein the first optics system bends optical pathways extending between the first optical facet and the proximal ends of the optical fibers of the first plurality of optical fibers by a non-zero-degree angle;
    mounting the second MOF connector on the second mounting surface such that at least one mating feature on the second side of the adapter is mated with at least one mating feature of the second MOF connector, the second MOF connector having a second optical facet that is adjacent to and aligned with the optical window and with the first optical facet, the second MOF connector having proximal ends of a second plurality of optical fibers secured thereto, the proximal ends of the second plurality of optical fibers being adjacent a second optics system of the second MOF connector, wherein the second optics system bends optical pathways extending between the second optical facet and the proximal ends of the optical fibers of the second plurality of optical fibers by the non-zero-degree angle; and
    transferring optical signals between the first and second optical facets of first and second MOF connectors, respectively, via the optical window of the adapter.

13. The method of claim 12, wherein said at least one mating feature of the first side of the adapter is a first pair of guide holes and wherein said at least one mating feature of the first MOF connector is a first pair of guide pins that are shaped and sized to mate with the first pair of guide pins, and wherein said at least one mating feature of the second side is a second pair of guide holes and wherein said at least one mating feature of the second MOF connector is a second pair of guide pins that are shaped and sized to mate with the second pair of guide holes.

14. The method of claim 13, wherein the first and second mounting surfaces are parallel to one another.

15. The method of claim 14, wherein the guide holes of the first pair of guide holes have axes that are normal to the first mounting surface of the adapter, and wherein the guide holes of the second pair of guide holes have axes that are normal to the second mounting surface of the adapter.

16. The method of claim 12, wherein the first and second MOF connectors include first and second connector dust covers, respectively.

17. The method of claim 16, wherein the adapter includes first and second adapter dust covers, the first adapter dust cover being pivotally coupled to the adapter by a first pivot-coupling feature disposed on the first side of the adapter on a first end of the adapter, and wherein the first pivot-coupling feature enables the first adapter dust cover to be pivoted from a closed position into an opened positioned and from the opened position into the closed position, wherein in the closed position, the first MOF connector is encapsulated in between inner surfaces of the first adapter dust cover and the first mounting surface, and wherein the second adapter dust cover is pivotally coupled to the adapter by a second pivot-coupling feature disposed on the second side of the adapter on a second end of the adapter, and wherein the second pivot-coupling feature enables the second adapter dust cover to be pivoted from a closed position into an opened positioned and from the opened position into the closed position, wherein in the closed position of the second adapter dust cover, the second MOF connector is encapsulated in between inner surfaces of the second adapter dust cover and the second mounting surface.

18. The method of claim 17, wherein the first pivot-coupling feature is also configured to pivotally couple to the first connector dust cover to assist in mounting the first MOF connector on the first mounting surface, and wherein the second pivot-coupling feature is also configured to pivotally couple to the second connector dust cover to assist in mounting the second MOF connector on the second mounting surface.

19. The method of claim 16, wherein the adapter includes first and second adapter dust covers, the first adapter dust cover being pivotally coupled to the adapter by a first pivot-coupling feature disposed on the first side of the adapter on a first end of the adapter, and wherein the first pivot-coupling feature enables the first adapter dust cover to be pivoted from a closed position into an opened positioned and from the opened position into the closed position, wherein in the closed position, the first MOF connector is encapsulated in between inner surfaces of the first adapter dust cover and the first mounting surface, and wherein the second adapter dust cover is pivotally coupled to the adapter by a second pivot -coupling feature disposed on the second side of the adapter on the first end of the adapter, and wherein the second pivot-coupling feature enables the second adapter dust cover to be pivoted from a closed position into an opened positioned and from the opened position into the closed position, wherein in the closed position of the second adapter dust cover, the second MOF connector is encapsulated in between inner surfaces of the second adapter dust cover and the second mounting surface.

20. The method of claim 19, wherein the first pivot-coupling feature is also configured to pivotally couple to the first connector dust cover to assist in mounting the first MOF connector on the first mounting surface, and wherein the second pivot-coupling feature is also configured to pivotally couple to the second connector dust cover to assist in mounting the second MOF connector on the second mounting surface.

21. The method of claim 12, wherein said at least one mating feature of the first side of the adapter is a first pair of guide holes and wherein said at least one mating feature of the first MOF connector is a first pair of guide pins that are shaped and sized to mate with the first pair of guide pins, and wherein the first MOF connector is a Prizm® connector, and wherein said at least one mating feature of the second side is a second pair of guide holes and wherein said at least one mating feature of the second MOF connector is a second pair of guide pins that are shaped and sized to mate with the second pair of guide holes, and wherein the second MOF connector is a Prizm® connector.

* * * * *